(12) United States Patent
Petrov

(10) Patent No.: US 10,331,330 B2
(45) Date of Patent: Jun. 25, 2019

(54) CAPTURING OBJECTS IN EDITABLE FORMAT USING GESTURES

(71) Applicant: INTEL CORPORATION, Santa Clara, CA (US)

(72) Inventor: Nikolay Andreevich Petrov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 636 days.

(21) Appl. No.: 13/993,639

(22) PCT Filed: Sep. 25, 2012

(86) PCT No.: PCT/RU2012/000779
§ 371 (c)(1),
(2) Date: Jun. 12, 2013

(87) PCT Pub. No.: WO2014/051451
PCT Pub. Date: Apr. 3, 2014

(65) Prior Publication Data
US 2015/0177944 A1 Jun. 25, 2015

(51) Int. Cl.
*G06F 3/0488* (2013.01)
*G06F 3/01* (2006.01)
(Continued)

(52) U.S. Cl.
CPC ............ *G06F 3/0488* (2013.01); *G06F 3/017* (2013.01); *G06F 3/0304* (2013.01);
(Continued)

(58) Field of Classification Search
CPC .............................. G06K 9/2054; G06K 9/20; G06F 2203/0381; G06F 3/0488; G06F 3/04883; G06F 3/017; G06F 3/01; G06T 19/006
See application file for complete search history.

(56) References Cited

U.S. PATENT DOCUMENTS 5,511,148 A * 4/1996 Wellner .................... 358/1.6
2002/0081040 A1 * 6/2002 Uchida ................. G06T 11/60
382/311
(Continued)

FOREIGN PATENT DOCUMENTS

WO WO2011/124956 A1 10/2011

OTHER PUBLICATIONS

"Text Capturing with SnagIT", by WPI Academic Technology Center, last modified Sep. 30, 2009, downloaded Jun. 20, 2015.*
(Continued)

*Primary Examiner* — Ryan Barrett
(74) *Attorney, Agent, or Firm* — Schwabe, Williamson & Wyatt, P.C.

(57) ABSTRACT

Embodiments of methods, systems, and storage medium associated with capturing, with a user device, at least a portion of an object based on a user gesture indicating a command are disclosed herein. In one instance, the method may include identifying a gesture associated with an object of interest external to the user device; capturing an image of at least a portion of the object of interest based on a result of the identifying the gesture; and providing the portion of the object in an editable format based on the image. Other embodiments may be described and/or claimed.

28 Claims, 7 Drawing Sheets

(51) Int. Cl.
*G06K 9/20* (2006.01)
*G06T 19/00* (2011.01)
*G06K 9/00* (2006.01)
*G06F 3/03* (2006.01)
*G06F 3/0484* (2013.01)

(52) U.S. Cl.
CPC ..... *G06F 3/04842* (2013.01); *G06K 9/00355* (2013.01); *G06K 9/00422* (2013.01); *G06K 9/2054* (2013.01); *G06T 19/006* (2013.01)

(56) References Cited

U.S. PATENT DOCUMENTS

| | | | |
|---|---|---|---|
| 2005/0286743 A1* | 12/2005 | Kurzweil et al. | 382/114 |
| 2007/0067721 A1 | 3/2007 | Ur et al. | |
| 2009/0079960 A1 | 3/2009 | Chung | |
| 2009/0262209 A1* | 10/2009 | Pai | H04N 1/00002 348/222.1 |
| 2011/0138317 A1* | 6/2011 | Kang | G06F 3/011 715/780 |
| 2012/0086727 A1* | 4/2012 | Korah | G06F 3/03 345/633 |
| 2012/0114249 A1 | 5/2012 | Conwell | |
| 2012/0221968 A1 | 8/2012 | Patterson et al. | |
| 2014/0049559 A1* | 2/2014 | Fleck | G03H 1/2249 345/633 |

OTHER PUBLICATIONS

Cuevas et al., "Moving Object Detection for Real-Time Augmented Reality Applications in a GPGPU," 2012, https://ieeexplore.ieee.org/document/6170063.*
International Search Report and Written Opinion dated Jun. 6, 2013 for International Application No. PCT/RU2012/000779, 7 pages.

* cited by examiner

CAPTURING OBJECTS IN EDITABLE FORMAT USING GESTURES

CROSS REFERENCE TO RELATED APPLICATIONS

The present application is a national phase entry under 35 U.S.C. § 371 of International Application No. PCT/RU2012/000779, filed Sep. 25, 2012, entitled "CAPTURING OBJECTS IN EDITABLE FORMAT USING GESTURES", which designated, among the various States, the United States of America. The Specification of the PCT/RU2012/000779 Application is hereby incorporated by reference.

FIELD

Embodiments of the present disclosure generally relate to the field of data communication, and more particularly, to techniques for capturing portions of real world objects and transforming the captured portions into a usable, such as editable, format.

BACKGROUND

Current achievements in information technology have changed the ways that people interact with the real world. However, in some cases, processes or operations that may work in computing environment may not always apply in the real world, even though users may need to have the computing-environment processes or operations be transferrable to a real-world environment. For example, in the computing environment a well-known method of copying content from a document and pasting the copied content to a different document may not be applicable when the user needs to obtain a digital, editable copy of content provided in the real world (e.g., a newspaper article, a billboard ad, etc.). In another example, the user may not be able to transfer information or a portion of information (e.g., a paragraph of a document) from a personal computer to a mobile device if the personal computer and the mobile device are not connected in some way (e.g., wirelessly via the Interact or through a wired connection between the devices' parts).

In general, the latest advancements in information technology may not always provide an easy and intuitive mechanism to capture specific information of interest (e.g., portions of texts, particular images, and other types of content) from the real world and transfer the information of interest onto a user's personal computing device, such as a mobile device, in a usable, such as editable, format.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Techniques described herein provide for capturing, with a user device, real-world objects or portions of objects as identified by a user and providing the captured objects or portions of objects with the user device in a usable, e.g., digital, format. Embodiments described herein may be realized in many forms, including, for example, identifying a gesture with which a user selects a portion of an object of interest in the real world, capturing the portion of the object in accordance with the selection with the identified gesture, processing the captured portion of the object, and providing the processed portion in a usable, such as editable, format.

For example, the user may point a user device, such as a mobile device enabled to capture images (e.g., with a camera associated with the device), at an object in the real world, such as a newspaper article. Having the article in the camera focus, the user may point at a portion of an article with a particular type of gesture, for example, using one or more fingers. The type of gesture may correspond to a particular type of selection of a portion of an article. For example, the gesture may indicate a selection of a paragraph, a sentence, an image, a word, and the like. For example, the user may indicate a paragraph that she may want to capture using two fingers, such a combination of a thumb and an index finger. The user device may be configured to identify the gesture and, based on the identified gesture, determine a type of selection of a portion of the article (in our example, a paragraph). The gesture identification may be based, for example, on a predefined library of gestures stored in a repository (e.g., data store) accessible by the user device. The portion of the article selected using a particular gesture may be captured, e.g., with the camera associated with the device. The captured portion may be processed to provide the captured portion in a usable, e.g., digital format, and may be displayed on a screen of the user device.

In one example, properties associated with the captured object or portion of the object may be captured along with the object (or portion of the object) and provided along with the captured portion, for example, by applying the properties to the captured portion. The properties associated with the captured object may include static parameters. For example, if the object is a portion of text, the parameters may include size, color, font, and the like. The properties may include dynamic characteristics, which the user device may be configured to calculate based on the monitoring of the object for a determined time period. For example, depending on a type of the object, the dynamic properties may include a number of rotations per second, speed, events count, and the like.

Figure 1:
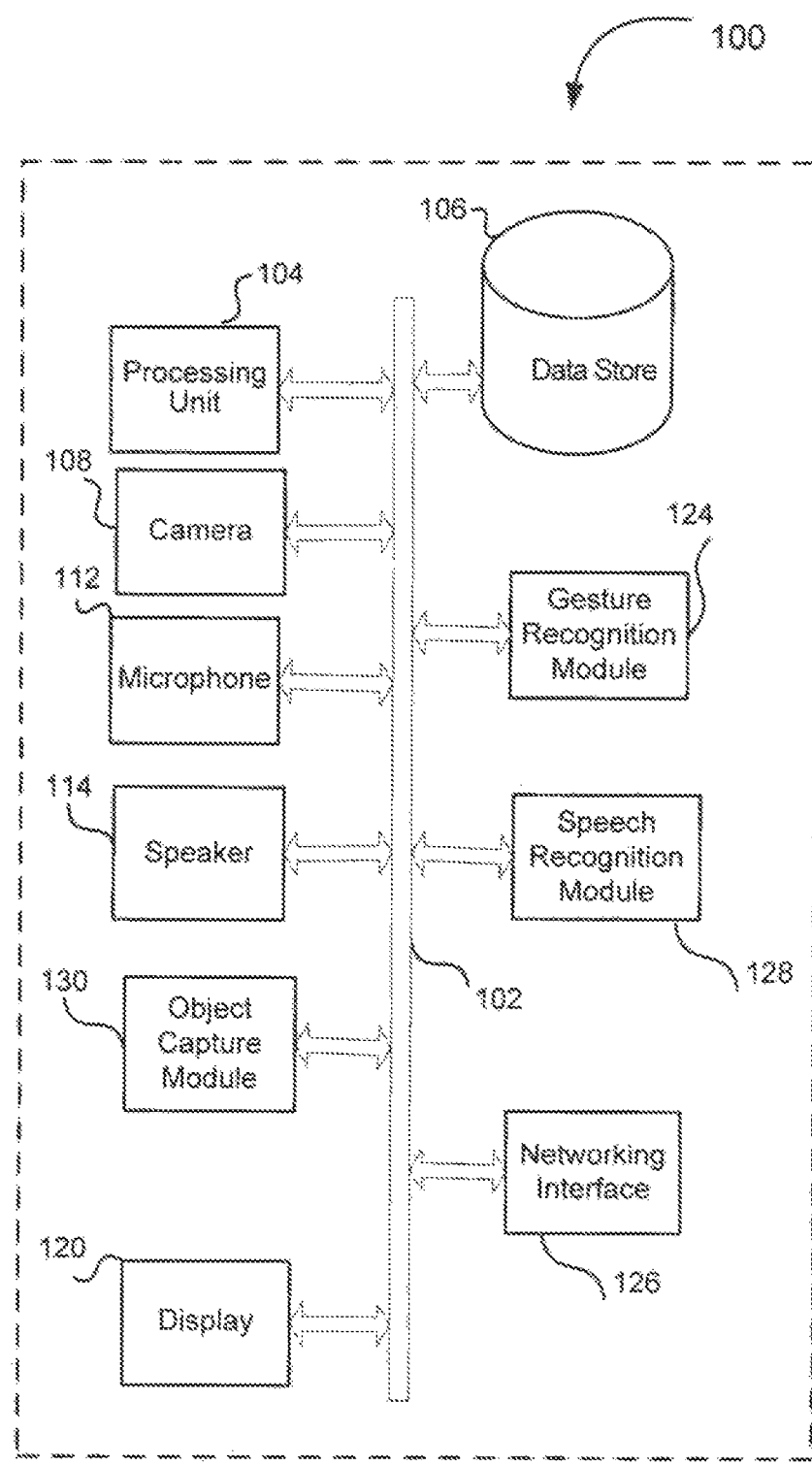
FIG. 1 illustrates an example block diagram of a user device configured to capture an object from the real world and make a copy of the captured object available in an editable (e.g., digital) format in accordance with various embodiments.

FIG. 1 is a block diagram of an example user (computing) device 100 configured to capture portions of objects from real world based on user selection in accordance with some embodiments. The user device 100 is not limited to the components described herein; other suitable configurations of the user devices using different components may be used without departing from the spirit of the present disclosure.

For example, some components or functions performed by the computing device may reside on, or performed by, one or more server devices.

For the illustrated embodiments, the user device 100 may include a number of components coupled, for example, via an interconnect 102. In one example, the interconnect 102 may include one or more buses. Examples of suitable buses may include, but not limited to, Peripheral Component Interconnect (PCI) buses, Universal Serial Buses (USB), and so forth. The user device 100 may include one or more processing units 104, each having a processor and a memory. Each processor may be a single or multi-core processor. The memory may be volatile or non-volatile, single level or hierarchical. In alternate embodiments, the processing units 104 may share memory. The processing units 104 may be associated with a data store 106 configured to store various types of data. For example, the data store 106 may store specific data related to captured objects or portions of objects, properties associated with objects or portions of objects, and the like, in another example, the data store 106 may store a predefined library of gestures needed for gesture recognition performed by the user device 100. The data store 106 may be any one of a number of optical, magnetic or solid-state mass storage devices. In another example, the data store 106 may reside at a remote server or in a "cloud" computing environment.

The data store 106 may also store computer-executable instructions (not shown) that may cause the user device 100, when executed by processing unit 104, to perform one or more of the operations described below in reference to the device's components. For the embodiments, the data store 106 may include computer-executable instructions configured to perform gesture recognition and/or speech recognition, such as using a gesture recognition module 124 and/or speech recognition module 128 described below in greater detail. Additionally, for the embodiments, the data store 106 may include computer-executable instructions configured to cooperate with gesture recognition module 124 and/or speech recognition module 128, to capture real-world objects or portions thereof, such as real-world object capture module 130. In another embodiment, the computer-executable instructions may be stored on data store 106 or another, e.g., remote data store and executed, for example, on a server supporting the user device 100 described herein. Generally, the instructions may be distributed among the user device 100 so as to facilitate dialogs between the user device 100 components in order to make informed decisions.

The user device 100 may further include one or more components, such as cameras 108, microphones 112, speakers 114, and the like in order to provide an ability to capture images of objects, receive user commands including gesture commands and voice commands, and the like. The device 100 may also include a display 120, for example, a touch-sensitive screen configured to receive user input via touch. The cameras 108 may include one or more 2D and 3D cameras configured to capture images in the real world. The microphones 112 (in one embodiment, an array of microphones) may be configured to receive user voice commands as described below in greater detail. The processing unit 104 may include encoding and/or decoding components configured to encode and/or decode photo, video, and audio feeds provided by the components 108, 112, 114.

User communications with the device 100 may include commands issued by the user, such as verbal (voice) commands, touch commands, gesture commands, commands issued via a user interface of the device, and so forth. Once a command is issued, device 100 may identify the command and respond accordingly, by performing the identified command.

As discussed above, the user device 100 may further include a speech recognition module 128 and gesture recognition module 124 configured to facilitate natural interactions with device 100, such as through voice and gesture commands as briefly described above. For example, the speech recognition module 128 may enable the user to issue a command to the user device 100, such as a command to switch from one mode of operation to another mode of operation, to capture an object or portion of an object, to perform editing of the captured object or portion of the object, and the like. The gesture recognition module 124 may be configured to identify a gesture associated with an object or a portion of the object and, based on that identification, determine a portion of the object to be selected, a set of properties associated with the object or the portion of the object that may be captured along with the object or the portion of the object, and the like. In response, another module, such as real-world object capture module 130 may response to appropriate ones of the identified commands, and capture real-world objects and/or portions thereof, and make the captured objects (or portions) available in a useable, such as editable, form.

The user device 100 may further include a networking interface module 126 configured to facilitate communications with other devices, e.g., other computing devices, servers, and the like (not shown). Communications between the user device 100 components, and/or between the user device 100 and other computing devices may occur via one or more wired or wireless, private or public networks, such as Internet. An example of a wired network may be an Ethernet network. Examples of wireless network may include, but are not limited to, Bluetooth®, WiFi (in accordance with one of Institute of Electrical Engineer's (IEEE) 802.11 standards), or 3G/4G and beyond wireless communication networks.

The user device 100 may be further configured to detect environmental conditions, such as, for example, ambient light and other conditions that may be taken into consideration when capturing object images in the real world. Based at least in part on the determined environmental conditions the user device 100 may make a determination regarding the best mode of operation when capturing an object or a portion of an object. In another example, based at least in part on the determined environmental conditions the user device 100 may adjust, or recommend an adjustment, settings associated with image capture depending on the changed environmental conditions. For example, the user device 100 may determine, and provide to the user, in near-real time, suggestions regarding the best position of the user device 100 vis-à-vis selected object, a number of images that may be taken in order to improve quality of the captured object image, and the like.

Figure 2:
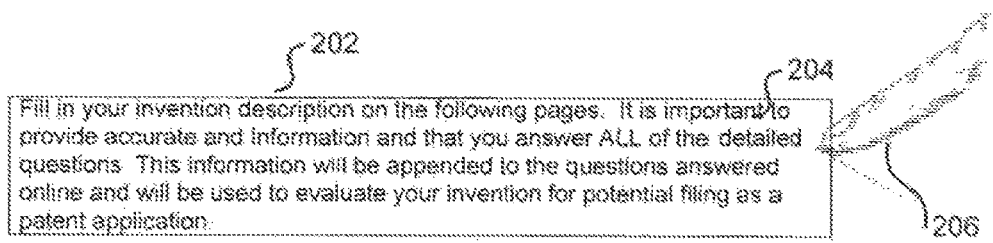
FIGS. 2-9 illustrate various examples of capturing of objects or portions of objects with a user device using gestures in accordance with various embodiments.

FIGS. 2-9 illustrate different examples of selecting various portions of objects, which are to be captured according to the identified user gestures. For example, FIG. 2 illustrates a portion of text 202, such as, a paragraph of text in a hard copy of a document. In another example, text 202 may be displayed to a user on user device's display. In yet another example, in a "virtual mode" described below in more detail, the user may see a real-time image (or image stream) provided by a camera associated with the user device and an overlay that may include additional information associated with the image, such as information selected by the user, additional images (pictograms), notifications, and the like. A user gesture, e.g., placing the finger 206 to the right or to the left of a particular word 204 may be interpreted (e.g., by gesture recognition module 124) as a command to recognize this word and copy the word, e.g., to a clipboard. As shown, the word 206 may be selected with the gesture indicated by finger 204.

Figure 3:

FIG. 3 illustrates a portion of text 302, for example, a paragraph of text in a hard copy of a document. In another example, text 302 may be displayed to a user on user device's display. A user gesture, e.g., user's fingers 304 placed to the right or to the left of a particular paragraph 302 may be interpreted (e.g., by gesture recognition module 124) as command to select this paragraph and copy the selected paragraph, e.g., to a clipboard. In this case one linger may be used to indicate an upper limit of the selected paragraph 302 and another finger may be used to indicate a lower limit for the selected portion of the text. As shown, paragraph 302 may be selected with the gesture indicated by lingers 304.

Figure 4:

FIG. 4 illustrates a portion of text 402, for example, a paragraph of text in a hard copy of a document. In another example, text 402 may be displayed to a user on user device's display. A user gesture, e.g., user's fingers 406 put in proximity to text 402 (e.g., wrapping around a particular portion of text 402, such as a portion of a sentence 404) may be interpreted (e.g., by gesture recognition module 124) as command to select this paragraph and copy the selected sentence 404, e.g., to a clipboard. Fingers 406 may be used to indicate the beginning and the end of the selected portion (e.g., a sentence). As shown, the sentence 404 may be selected with the gesture indicated by fingers 406. It should be noted that the sentence 404 is not limited by a single line of text. The sentence 406 may start on one line and end a few lines below the first line.

Figure 5:
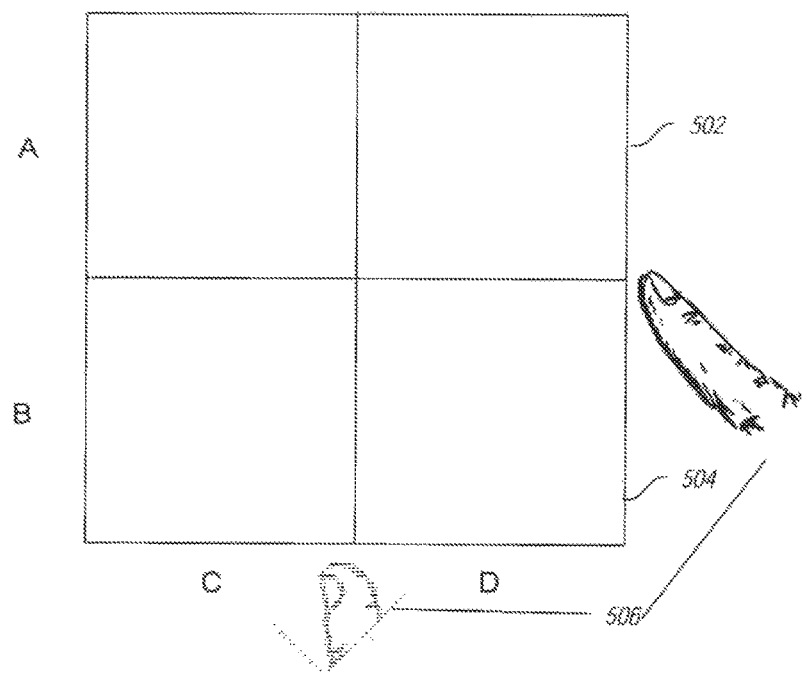

FIG. 5 illustrates an object (e.g., one or more images or portions of text) 502. In another example, the portions of the object 502 may be displayed to a user on user device's display. To select one or more portions of the object 502, it may be possible to use a "frame gesture" indicated by the fingers 506 to crop the image or a portion of the image or text 504. Simply put, a frame of the image or text 504 may be defined by two fingers 506 placed on the borders of imaginary rectangle that may be interpreted (e.g., by gesture recognition module 124) as a command to select and crop the image 504. In one example, fingers 506 may be pointing to the middle of sides of the selected rectangle (e.g., fingers may be held in "L shape"), so that the user may be able to control a position of the selected rectangle, ratio between sides of the selected rectangle, rotation of the selected image, and the like. In one example, additional voice commands such as a "square border" or "L shape" may define a method of selection of the area of the image (text) 504.

Figure 6:
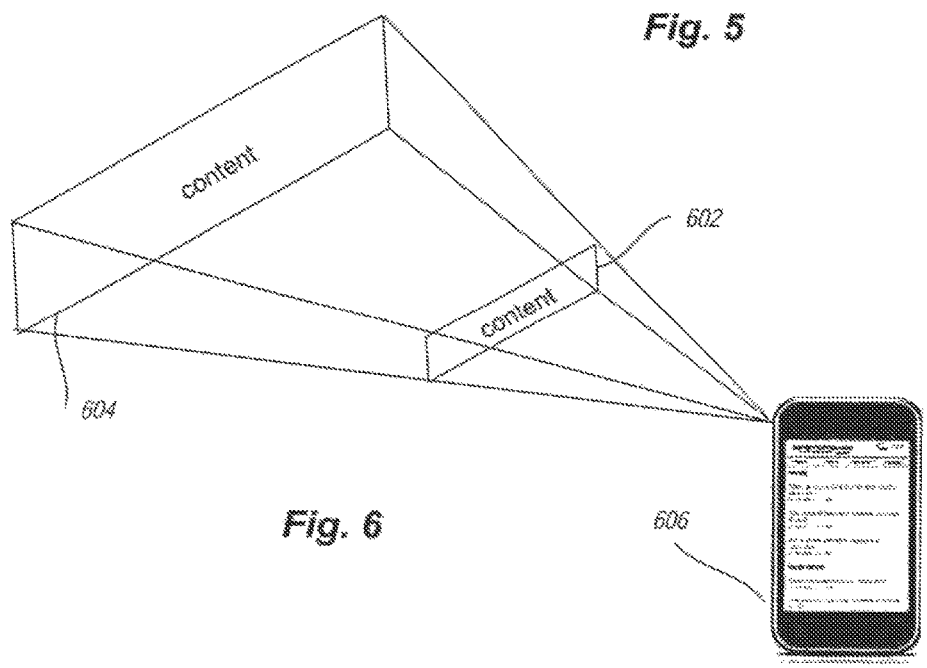

FIG. 6 illustrates different examples of object selection. The object (e.g., content such as text, images, and the like) may be located on a "real" surface 602, which a user may be able to point at or touch (e.g., a newspaper, a magazine, a sticker, a note, and the like). In other words, the "real" surface 602 may be placed in near proximity to a user device 606 and may be accessible by the user. In this example, the user device 606 (e.g., a mobile phone with a camera) may be placed near the "real" surface 602, so that the user may easily point to, and select with a recognizable gesture, a portion of the object as described in reference to FIGS. 2-5.

In another example, the object may be also located on a "virtual" surface 604 (e.g., a billboard, a building, or any other large object located at a remote distance from the user device). In another example, the object may be placed remotely, at a distance of the camera of the user device 606, such as content on the billboard ("virtual" surface) 604. In this example, the user may be able to point a camera at the surface 604 and select a desired portion of the object using a gesture in front of the camera that may be projected to the surface 604 as may be viewed through the camera focus.

Figure 7:
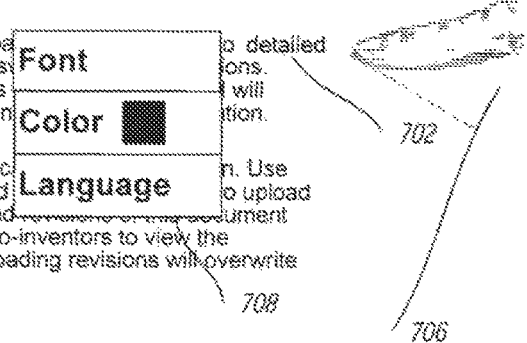

FIG. 7 illustrates a selection of a portion of an object similar to that described in reference to FIG. 2. In this example, the portion 702 (word) of the object 704 (text) selected with the gesture indicated by finger 706 may have associated set of properties 708 that user may be able to change, copy or apply to another selected object. The user may use an additional gesture command (e.g., "push") or a voice command (e.g., "properties") in order to open a window showing the set of properties 708 associated with the selected portion (word) 702. The set of properties 708 may be captured along with the selected portion of the object and used in subsequent work with the captured portion (e.g., editing the captured portion, pasting the captured portion into a different document, and the like).

Figure 8:
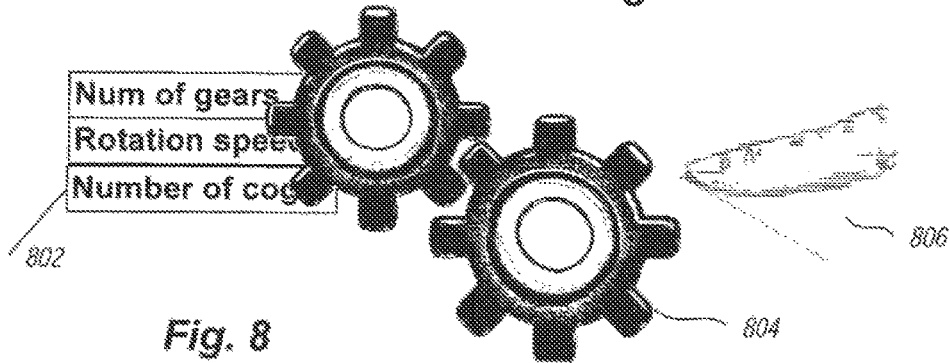

FIG. 8 illustrates an example where the properties 802 of the moving object (gears) 804 selected with a gesture indicated by a finger 806 may be dynamic. As shown, the dynamic properties may include, in addition to a number of gears and cogs, rotation speed, velocity, and/or other dynamic properties that may be associated with the object 804. In one example, the device may calculate the dynamic properties in real- or near-real time. As described in reference to FIG. 7, the set of properties 802 may be captured along with the selected portion of the object 804 and used in subsequent work with the selected object 804.

Figure 9:
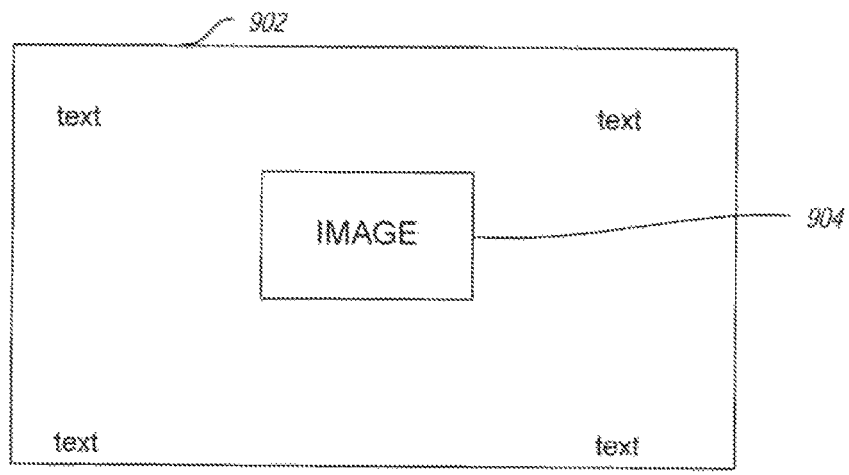

FIG. 9 illustrates an example of manipulating multiple selected objects using gestures and/or other commands. Assume a user selected an article (shown in FIG. 9 as text 902) from a newspaper using a gesture as described above and the device captured the article 902 and rendered the captured article on the screen of the device. A content item (e.g., an image 904) stored in a memory accessible by the user device may be placed (e.g., inserted) in the displayed newspaper article such that the text 902 may wrap around the inserted image 904. Manipulating multiple objects is described in greater detail in reference to FIG. 11.

Figure 10:
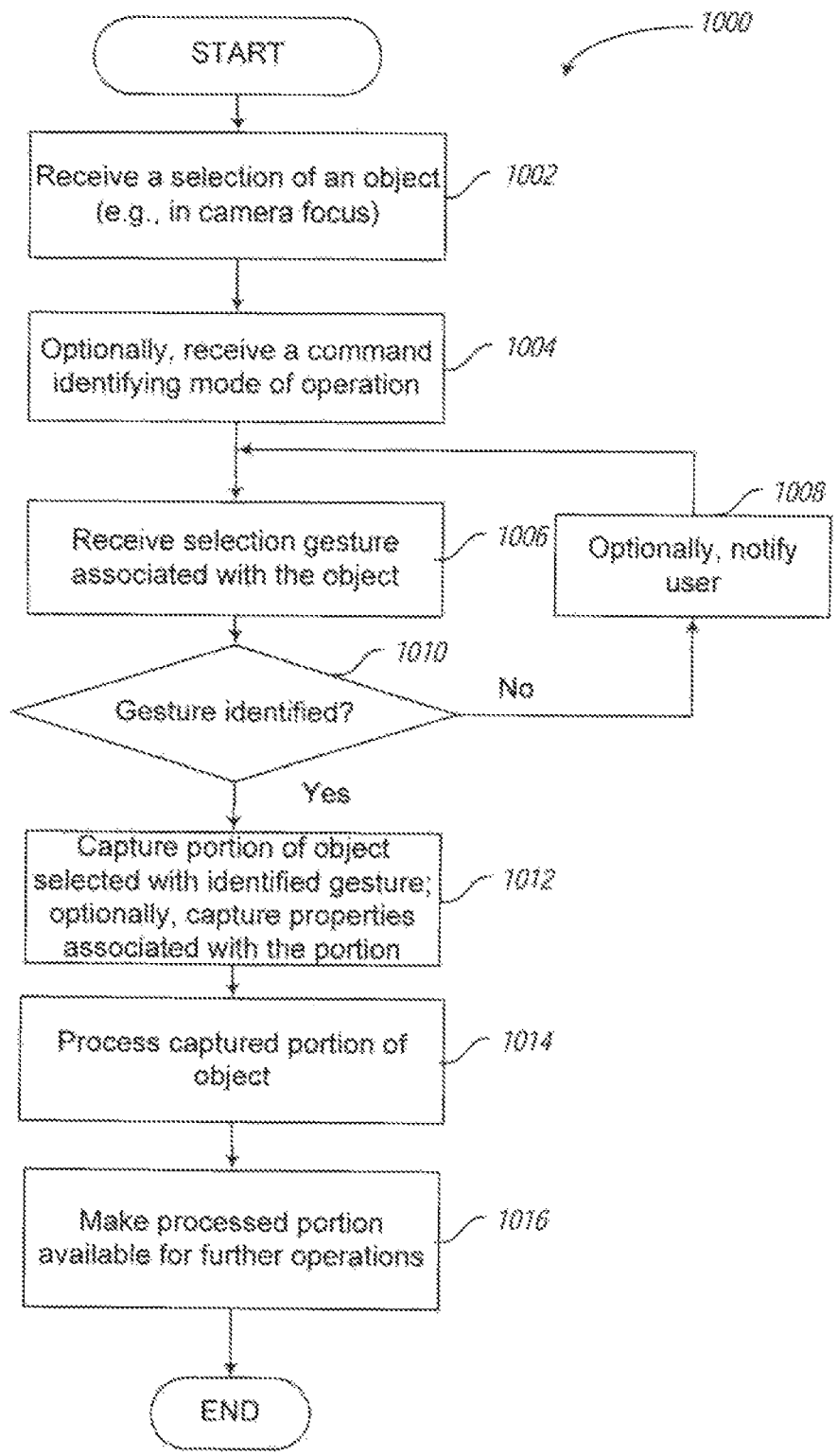
FIG. 10 illustrates a process flow diagram for capturing a portion of an object using gesture commands in accordance with various embodiments.

FIG. 10 illustrates a process flow diagram for operation of a user device configured to capture objects or portions of objects from the real world in response to user commands in accordance with various embodiments. The process 1000 may begin at block 1002, where the user device may receive a selection of an object from the real world. For example, the user may point a user device's camera at a particular object or group of objects. At block 1004, the user device may receive a command identifying a mode of operation of the user device. For example, the mode of operation may include a "text" mode, wherein the user device is configured to operate with text or portions of text, or an "image" mode, wherein the user device is configured to operate with images or portions of images.

In one example, voice commands may be used to operate a user device and to switch between "text" and "image" modes. Generally, voice interaction may replace, or be used in addition to, manual interaction with the user device. This may prove beneficial for the user because in some cases one hand of the user may be used for command gestures and it may be difficult to interact with the user device using another hand. Accordingly, commands and other instructions for the user device may be issued by voice.

At block 1006, the user device may receive a gesture associated with the object or the portion of the object. At decision block 1010, the user device (e.g., using gesture recognition module 124) may determine whether the received gesture is identified. In one example, the gesture identification may be based on comparing a gesture to a predefined library of gestures accessible by the user device and determining a match.

Every gesture in the predefined library may have a corresponding command associated with the gesture that may be recognized and performed by the user device based on the identification of the gesture. For example, as described above in reference to FIGS. 2-9, some of the gestures may include, but are not limited to, the following.

A finger placed to the right or to the left of a word in a text may be interpreted as a command to recognize this word and copy it to clipboard.

Two fingers placed to the right or to the left of the text (e.g., at left and/or right bounds of the text) may be interpreted as a command to recognize a set of lines or a paragraph. In this command, one finger may be used as an upper limit and another finger may be used as a lower limit indicated the selected portion of the text selection that may be processed by the user device.

Two fingers placed on a line of the text line may set boundaries for a sentence or a set of words that may be processed by the user device. The gesture may be used to select text placed in more than one line. In this example, the selection mechanism may be similar to that of a text editor.

A finger pointed to a detached image may indicate that a user device take a cropped picture. For example, in case of a page with multiple logotypes a finger may point to one of the logotypes and the captured image of the logotype may be cropped to fit a particular space.

A "frame gesture" indicated by two fingers in the "image" mode of operation of the user device may indicate the borders of imaginary rectangle that may be used as crop border for the image.

In order to recognize the above example gesture commands, the user device may be configured to recognize a direction of a user's finger based on a finger position relative to the object. In the example of a word selection discussed above in reference to FIG. 2, an imaginary line passing through the finger may point to a particular side of a word on the text. Voice commands, such as, for example, "Use finger direction" may be used to enable the user device to recognize a direction at which the finger is pointing.

In another example, a relative position of the camera to a finger may be determined. Continuing with a word selection example, a finger placed in the right side (e.g., right half) of a captured image may be treated as placed to the right of word. Respectively a finger placed in the left half of captured image may be treated as placed to the left of word. Using voice commands, such as "to the right" or "to the left" may further define a finger position for the user device.

If the received gesture is not identified, at block 1008, optionally, the user device may notify the user that the gesture was not identified. For example, the user device may display a message indicating that the received gesture was not identified and provide an option for the user to reproduce the gesture. The process 1000 then may move back to block to 1008.

If the received gesture is identified, at block 1012, real-world capture module 130 may cause the selected object or portion of the object to be captured, e.g., using the camera associated with the user device. In one example, e.g., in a virtual desktop mode described herein, the image may have been already captured and may be displayed to a user in a form of "augmented reality," showing notifications associated with the captured image, suggestions to the user, and the like. At block 1014, the image of the captured object or portion of the object may be processed, e.g., by real-world object capture module 130, into a usable, e.g., editable, form. Processing of an image and making available of its content, e.g., text, available in editable form, may be performed using anyone of a number of techniques known in the art, e.g., optical character recognition (OCR), and other techniques of the like. In one example, the object properties may be captured along with the object as described in reference to FIG. 8. The object properties may be captured in response to a user request. For example, a voice command "properties" or a "push" gesture may open a properties box or window associated with the selected object or a portion of the object. The user may be able to work with particular properties of the object, for example, edit (e.g., change) one or more parameter, copy one or more property parameter, or apply the property parameters to another selected area (portion) of the object (e.g., another object).

At block 1016, the processed portion or the object may be made available to the user, for example, for further processing or other operations associated with the captured object or the portion of the object, using one or more other applications executed by processing unit 104.

Figure 11:
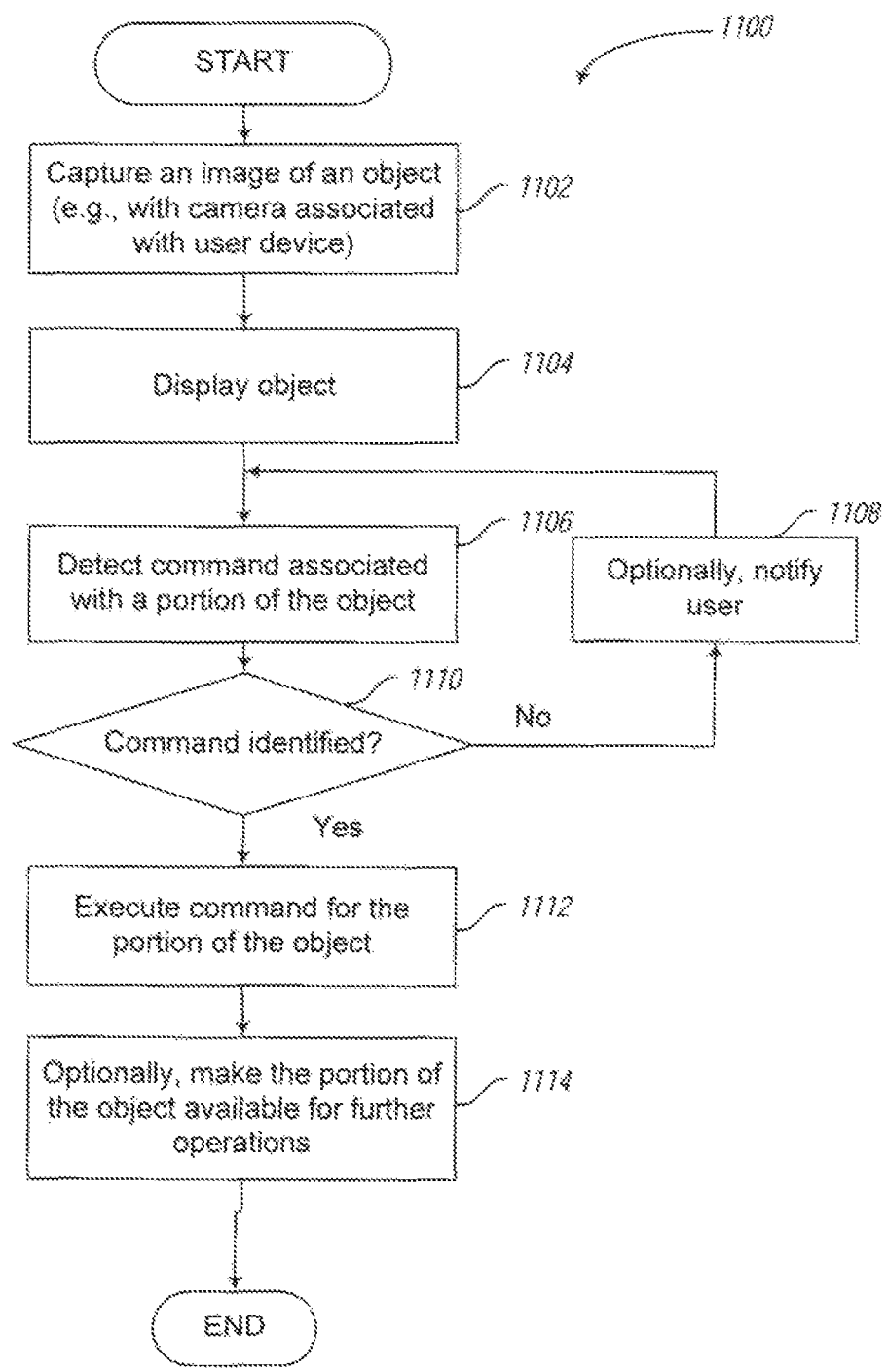
FIG. 11 illustrates a process flow diagram for manipulating multiple objects on a virtual desktop in accordance with various embodiments.

FIG. 11 is a process flow diagram illustrating a process for manipulating multiple objects on a virtual desktop in accordance with various embodiments in accordance with various embodiments. The process 1100 may begin at block 1102, where the user device may capture an image of an object, for example, with a camera associated with the user device. For example, the user may take a picture of the object or simply point a camera at the object so that the object is displayed to the user at the device display or is visible by the user via the device's camera lens. Accordingly, at block 1104, the captured image of the object may be made available to the user by the user device.

At block 1106, a command associated with an object may be detected. In one example, the command may be associated with a portion of the object, e.g., an image within the text of an article. In another example, the command may be associated with another object, for example, stored in an editable format on the user device or at a repository accessible by the user device. The command may take different firms. For example, the command may include a gesture as described above and applied to a screen of the user device (e.g., when the screen is touch-sensitive). In another example, the command may include a voice command that may be recognized by the user device.

At decision block 1110, the user device may determine whether the detected command is identified. If the command is not identified, at block 1108, optionally, the user device may notify the user that the command is not identified. For example, the user device may display a message indicating that the command is not identified and provide an option for the user to re-enter the command.

If the user device identifies the command at decision block 1110, the identified command may be performed, e.g., by real-world object capture module 130, at block 1112. The identified command may be associated with the displayed object. More specifically, the command may be associated with a portion of the displayed object or another object accessible by the user device. For example, the command may indicate that an object stored in a data store and accessible by the user device be incorporated (e.g., inserted) into the displayed object, as discussed above in reference to FIG. 9.

In general, the user device may act as a virtual desktop, enabling a user to work with an image and augmented reality overlay (e.g., text of an article) displayed on the device screen or viewed through the camera. Different commands, such as "drag and drop" gestures may be used to support a user interaction with a virtual desktop. By "grabbing" a selected area (portion) of an object the user may move it across a virtual desktop. Similar approach may be used in order to work with the object's properties.

For example, the user may want to move a stored image into a display of the object (e.g., newspaper article) as described above in reference to FIG. 9. In another example, several images may be combined, such as one or more images in an editable format (e.g., digital format) may overlay a portion of a real image or an object that may be viewed through the camera of the user device.

At block 1114, the object, augmented or otherwise edited as a result of the command executed at step 1112, may be made available for further operations (e.g., commands) according to the user preference. For example, the user may further edit the selected object or portion of the object, incorporate a portion of the object in another object (e.g., a document, an email message, and the like), store the manipulated object or portion of the object, send the manipulated object or portion of the object to another user, and the like.

Figure 12:
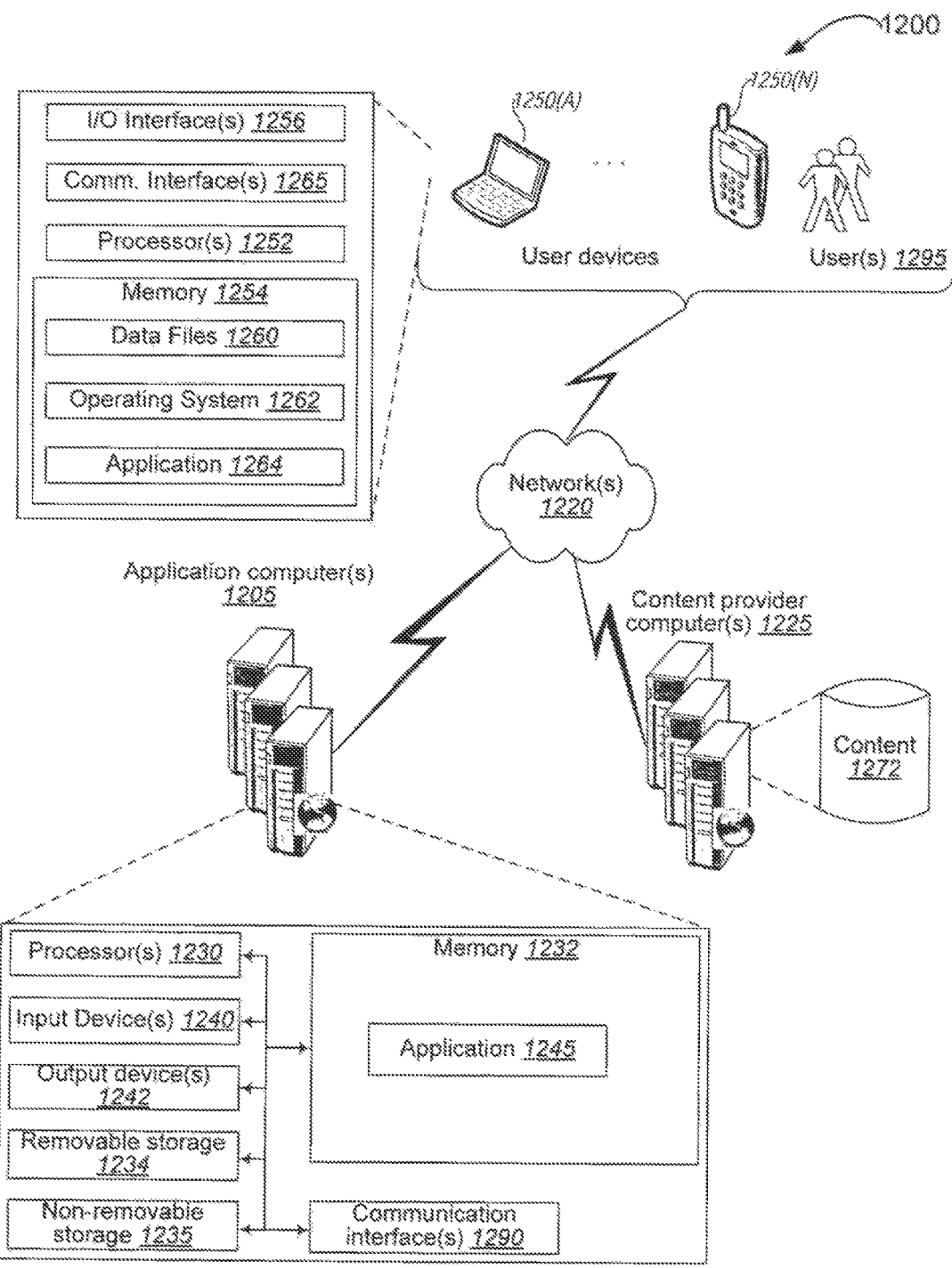
FIG. 12 illustrates an environment in which various embodiments of the system configured to enable object selection using gestures may be implemented.

FIG. 12 illustrates an example environment (e.g., system) 1200 suitable for implementing mediated embodiments of capturing an object or a portion of the object described herein in accordance with various embodiments. As will be appreciated, although a Web-based environment is used for purposes of explanation, different environments may be used, as appropriate, to implement various embodiments. The environment 1200 may include user devices 1250(A)-1250(N) of various users, one or more devices 1250(A)-1250(N) may be associated with each user 1295. Various devices 1250(A)-1250(N) may include computing devices equipped as earlier described with references to FIG. 1, and operable to capture an object based on a user gesture as described above. Each one of devices 1250(A)-1250(N) may include a processor 1252 and memory 1254 for storing processor-executable instructions, such as data files 1260, operating system 1262, and one or more applications 1264, such as the client side of an object capture application, and applications configured to enable the capture of the object or a portion of the object using gesture commands.

Each one of devices 1250(A)-1250(N) may further include at least one or both of the following elements: input/output interface 1256 designed to enable peripheral component interaction with the system 1200 and communication interface 1265. In various embodiments, the input/output interface 1256 may include, but is not limited to, a display, e.g., a liquid crystal display, a touch screen display, etc., a speaker, a microphone, a camera, and/or other components described in reference to FIG. 1. For embodiments including a display supporting touch screen features, the system 1200 may include a touch screen controller for facilitating control of the display. As discussed above, operating system 1262 and/or an application 1264 may include software components configured, when executed on the processor 1252, to cause the system 1200 to perform one or more operations, such as operations of gesture recognition module 124, speech recognition module 128, real-world object capture module 130, and so forth, enabling capturing objects or portions of objects as described in reference to FIGS. 1-11.

The network 1220 may include any appropriate network or networks, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network may be enabled by wired or wireless connections, and combinations thereof. In one example, the environment 1200 may be configured to provide the capabilities described in reference to FIGS. 1-11 using devices 1250(A)-1250(N) that may be connected through a network described above, to application computers 1205 and content provider computers (e.g., servers) 1225.

In another example, the network may include the Internet, and the environment may include one or more Web servers (content provider servers) 1225 for receiving requests and serving content in response thereto, although for other networks, an alternative device serving a similar purpose could be used, as would be apparent to one of ordinary skill in the art. The illustrative environment 1200 may also include at least one application computer (e.g., server) 1205 including, or associated with, one or more processors 1230, input devices 1240, output devices 1242 (e.g., administrative input/output devices), removable storage 1234, and non-removable storage 1235 that may be connected to a communication interface 1290 and memory 1232. Applications 1245 may reside on the application computers 1205 and execute thereon. In alternate embodiments, applications 1245 may execute partly on the devices 1250(A)-1260(N) and partly on the application computers 1205.

The handling of all requests and responses, for example, the requests for content initiated by the user 1295 as well as the delivery of content between the devices 1250(A)-1250 (N) and the application computers 1205, may be handled by one or more content provider Web servers 1225. The content data store 1272 may be associated with the Web server 1225. The data store 1272 is operable, through logic associated therewith, to receive instructions from the server 1225 and obtain, update, or otherwise process data in response thereto.

Each server may include an operating system that provides executable program instructions for the general administration and operation of that server, and typically may include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 1200 may include a variety of data stores and other memory and storage media as discussed above. These may reside in a variety of locations, such as on a storage medium local to (and/or resident in) one or more of the computers or remote from any or all of the computers across the network. Any necessary files for performing the functions attributed to the computers, servers, or other network devices may be stored locally and/or remotely, as appropriate. The storage media may include disk drives, optical storage devices, and solid-state storage devices, such as random access memory (RAM) or read-only memory (ROM), flash memory or other memory technology, CD-ROM, digital versatile disk (DVD) or other optical storage, magnetic cassettes, magnetic tape, magnetic disk storage or other magnetic storage devices, as well as removable media devices, memory cards, flash cards, or any other medium which may be used to store the desired information and which may be accessed by a processor.

The environment (system) 1200 may be a distributed interaction environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature, and not limited to the scope of the disclosure.

According to various embodiments, the present disclosure describes at least one computing device-readable storage medium having instructions stored thereon that, in response to execution by a computing device, cause the computing device to: identify a gesture associated with an object of interest external to the computing device; based on a result of identifying the gesture, capture an image of at least a portion of the object of interest; and provide the portion of the object in an editable format based on the image.

The instructions, in response to execution by the computing device, further cause the computing device to process the image to provide the portion of the object of interest in the editable format. The instructions, in response to execution by the computing device, further cause the computing device to capture one or more properties associated with the portion of the object of interest. The one or more properties may be selected from at least one of dynamic characteristics associated with the portion of the object of interest or static parameters associated with the portion of the object of interest. The object may be associated with at least one of a real surface or a virtual surface. The portion of the object of interest may be a selected one of text or image.

The instructions, in response to execution by the computing device, further cause the computing device to receive a command indicating a mode of operation of the computing device and change the mode of operation in accordance with the command. The command may be selected from at least one of a gesture command or a voice command. The mode of operation may include at least one of a text mode or an image mode.

The instructions, in response to execution by the computing device, further cause the computing device to select the portion of the object of interest based on the result of the identifying. The object of interest may be rendered for display on the computing device. The instructions, in response to execution by the computing device, further cause the computing device to receive a command indicating an operation associated with the portion of the object of interest and, in response to the command, perform the indicated operation. The command may be selected from one of a gesture command or a voice command. The operation associated with the portion of the object of interest may include at least one of: editing the portion of the object of interest or incorporating the portion of the object of interest into a document.

According to various embodiments, the present disclosure describes at least computing device comprising a processor and an object capture application operated by the processor to: identify a gesture indicating a command associated with an object of interest external to the computing device; based on a result of identifying the gesture, capture an image of at least a portion of the object of interest according to the command; and provide the portion of the object in an editable format based on the image.

The object capture application may be further configured to cause the computing device to process the image to provide the portion of the object of interest in the editable format or cause another computing device to process the image to provide the portion of the object of interest in the editable format. The object capture application may be further configured to capture, in response to a request, one or more properties associated with the portion of the object of interest. The one or more properties may be selected from at least one of dynamic characteristics associated with the portion of the object of interest or static parameters associated with the portion of the object of interest. The dynamic characteristics may include one or more parameters associated with a motion of the portion of the object, and the static parameters may include at least one of size, color, or language associated with the portion of the object.

According to various embodiments, the present disclosure describes an apparatus comprising: means for identifying a gesture associated with an object of interest external to the computing device; and means for capturing, an image of at least a portion of the object of interest based on a result of the identifying the gesture, and output the portion of the object in an editable format based on the image.

According to various embodiments, the present disclosure describes a computer-implemented method comprising: identifying, with a computing device, a gesture associated with an object of interest external to the computing device; capturing, with the computing device, an image of at least a portion of the object of interest based on a result of the identifying the gesture; and providing, with the computing device the portion of the object in an editable format based on the image. The method may further include capturing, with the computing device, one or more properties associated with the portion of the object of interest.

Identifying a gesture associated with an object of interest external to the computing device may include identifying, with the computing device, the gesture based on a library of gestures, and identifying, with the computing device, the at least a portion of the object that is to be captured by the computing device based on the identified gesture. The library of gestures may be stored in a data store and may be accessible by the computing device.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, limited only by the claims.

The invention claimed is:

1. At least one non-transitory computing device-readable storage medium having instructions stored thereon that, in response to execution by a computing device, cause the computing device to:

identify a gesture associated with a displayed first image of an object of interest external to the computing device, the gesture indicating a combination of commands comprising a first command to select and capture at least a portion of the object of interest from the displayed first image, the selected portion including one or more moving non-textual elements, a second command to perform an operation on the selected portion of the object of interest, and a third command to expose a set of inferred dynamic properties associated with the one or more moving non-textual elements;

based on a result of identifying the gesture, select the at least a portion of the object from the displayed first image, calculate the set of inferred dynamic properties, and capture a second image of the at least a portion of the object of interest and the exposed inferred dynamic properties from the displayed first image of the object, in response to the first and third commands provided by the identified gesture;

wherein the computing device comprises a mobile device, and wherein to capture the second image includes to determine and provide a suggestion of a particular positioning of the computing device relative to the displayed first image of the object to capture the second image of the at least a portion of the object of interest from the displayed first image of the object;

perform the indicated operation on the captured second image of the portion of the object, according to the second command indicated by the identified gesture; and process the second image, after performance of the operations indicated by the first and second commands, to generate a third image, the third image to be provided in an editable format for use in one or more further operations in accordance with one or more further commands.

2. The non-transitory computing device-readable storage medium of claim 1, wherein the instructions, in response to execution by the computing device, further cause the computing device to capture one or more properties associated with the portion of the object of interest, according to the combination of commands indicated by the identified gesture.

3. The non-transitory computing device-readable storage medium of claim 2, wherein the one or more properties are selected from at least one of dynamic characteristics associated with the portion of the object of interest or static parameters associated with the portion of the object of interest.

4. The non-transitory computing device-readable storage medium of claim 1, wherein the instructions, in response to execution by the computing device, further cause the computing device to:

receive a command indicating a mode of operation of the computing device, wherein the mode of operation includes at least one of a text mode or an image mode; and change the mode of operation in accordance with the mode indicating command, wherein the instructions cause the computing device to operate with text or portions of text in the text mode, and to operate with images or portions of images in the image mode.

5. The non-transitory computing device-readable storage medium of claim 4, wherein the mode indicating command is selected from at least one of a gesture command or a voice command.

6. The non-transitory computing device-readable storage medium of claim 1, wherein the object is associated with at least one of a real surface or a virtual surface.

7. The non-transitory computing device-readable storage medium of claim 1, wherein the instructions, in response to execution by the computing device, further cause the computing device to copy the selected portion of the object of interest to a clipboard, according to the combination of commands.

8. The non-transitory computing device-readable storage medium of claim 7, wherein the copied portion of the object of interest is rendered for display on the computing device.

9. The non-transitory computing device-readable storage medium of claim 7, wherein the object comprises a text, wherein to identify a gesture includes to determine a placement of two fingers of a user relative to a portion of the text to be selected and copied, wherein one finger is to indicate an upper limit of the portion of the text to be selected and copied, and another finger is to indicate a lower limit of the portion of the text to be selected and copied, wherein to determine a placement includes to determine whether the two fingers are placed to a left or to a right from the portion of the text to be selected and copied.

10. The non-transitory computing device-readable storage medium of claim 7, wherein the object comprises a text, wherein to identify a gesture includes to determine that two fingers of a user are wrapped around of a portion of the text to be selected and copied, wherein the portion of the text comprises a sentence or part of the sentence.

11. The non-transitory computing device-readable storage medium of claim 1, wherein the operation associated with the portion of the object of interest includes at least one of: editing the portion of the object of interest or incorporating the portion of the object of interest into a document.

12. The non-transitory computing device-readable storage medium of claim 1, wherein the portion of the object of interest is a selected one of text or image.

13. The non-transitory computing device-readable storage medium of claim 1, wherein the inferred dynamic properties include at least one of a speed, a velocity or a rotational speed of at least one of the moving non-textual elements.

14. The non-transitory computing device-readable storage medium of claim 13, wherein calculate the set of inferred dynamic properties includes to calculate in real or near-real time at least one of the speed, velocity or rotational speed.

15. A computing device comprising:

a processor; and an object capture application operated by the processor to:

identify a gesture associated with a displayed first image of an object of interest external to the computing device, the gesture indicating a combination of commands comprising a first command to select and capture at least a portion of the object of interest from the displayed first image, the selected portion including one or more moving non-textual elements, a second command to perform an operation on the selected portion of the object of interest, and a third command to expose a set of inferred dynamic properties associated with the one or more moving non-textual elements;

based on a result of identifying the gesture, select the at least a portion of the object from the displayed first image, calculate the set of inferred dynamic properties, and capture a second image of the at least a portion of the object of interest and the exposed inferred dynamic properties from the displayed first image of the object, in response to the first and third commands provided by the identified gesture;

wherein the computing device comprises a mobile device, and wherein to capture the second image includes to determine and provide a suggestion of a particular positioning of the computing device relative to the displayed first image of the object to capture the second image of the at least a portion of the object of interest from the displayed first image of the object;

perform the indicated operation on the captured second image of the portion of the object, in response to the second command; and process the second image, after performance of the operation indicated by the second command, to generate a third image, or cause another computing device to process the second image, after performance of the operations indicated by the first and second commands, to generate the third image, the third image to be provided in an editable format for use in one or more further operations in accordance with one or more further commands.

16. The computing device of claim 15, wherein the object capture application is further configured to capture, in response to a request, one or more properties associated with the portion of the object of interest.

17. The computing device of claim 16, wherein the one or more properties are selected from at least one of dynamic characteristics associated with the portion of the object of interest or static parameters associated with the portion of the object of interest.

18. The computing device of claim 17, wherein the dynamic characteristics include one or more parameters associated with a motion of the portion of the object, and wherein the static parameters include at least one of size, color, or language associated with the portion of the object.

19. The computing device of claim 15, wherein the inferred dynamic properties include at least one of a speed, a velocity or a rotational speed of at least one of the moving non-textual elements.

20. The computing device of claim 19, wherein calculate the set of inferred dynamic properties includes to calculate in real or near-real time at least one of the speed, velocity or rotational speed.

21. A computer-implemented method comprising:
identifying, by a computing device, a gesture associated with a displayed first image of an object of interest external to the computing device, the gesture indicating a combination of commands comprising a first command to select and capture at least a portion of the object of interest from the displayed first image, the selected portion including one or more moving non-textual elements, a second command to perform an operation on the selected portion of the object of interest, and a third command to expose a set of inferred dynamic properties associated with the one or more moving non-textual elements;
selecting, by the computing device, the at least a portion of the object of interest from the displayed first image of the object in response to the first command, according to the identified gesture;
calculating the set of inferred dynamic properties;
capturing, by the computing device, a second image of the selected portion of the object of interest and the exposed inferred dynamic properties from the displayed first image, in response to the first and third commands;
wherein the computing device comprises a mobile device, and wherein capturing the second image includes determining and providing a suggestion of a particular positioning of the computing device relative to the displayed first image of the object to capture the second image of the at least a portion of the object of interest from the displayed first image of the object;
performing, by the computing device, the indicated operation on the captured second image of the portion of the object according to the second command indicated by the gesture; and
processing the second image, after performance of the operations indicated by the first and second commands, to generate a third image, the third image to be provided in an editable format for use in one or more further operations in accordance with one or more further commands.

22. The computer-implemented method of claim 21, wherein the editable format includes a digital form of representation of the portion of the object.

23. The computer-implemented method of claim 21, further comprising capturing, by the computing device, one or more properties associated with the portion of the object of interest.

24. The computer-implemented method of claim 21, wherein identifying a gesture associated with an object of interest external to the computing device includes:
identifying, by the computing device, the gesture based on a library of gestures.

25. The computer-implemented method of claim 24, wherein the library of gestures is stored in a data store and is accessible by the computing device.

26. The computer-implemented method of claim 21, wherein the portion of the object of interest is a selected one of text or image.

27. The computer-implemented method of claim 21, wherein the inferred dynamic properties include at least one of a speed, a velocity or a rotational speed of at least one of the moving non-textual elements.

28. The computer-implemented method of claim 27, wherein calculating the set of inferred dynamic properties further comprises calculating in real or near-real time at least one of the speed, velocity or rotational speed.

* * * * *